US012309572B2

(12) United States Patent
MacLean

(10) Patent No.: US 12,309,572 B2
(45) Date of Patent: May 20, 2025

(54) SYSTEMS AND METHODS OF SPATIAL AUDIO PLAYBACK WITH ENHANCED IMMERSIVENESS

(71) Applicant: Sonos, Inc., Santa Barbara, CA (US)

(72) Inventor: Paul MacLean, Quincy, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/498,428

(22) Filed: Oct. 31, 2023

(65) Prior Publication Data

US 2024/0137722 A1 Apr. 25, 2024
US 2024/0236600 A9 Jul. 11, 2024

Related U.S. Application Data

(63) Continuation of application No. 18/175,045, filed on Feb. 27, 2023, now Pat. No. 11,818,565, which is a continuation of application No. 17/455,830, filed on Nov. 19, 2021, now Pat. No. 11,627,426, which is a continuation of application No. 17/247,029, filed on Nov. 24, 2020, now Pat. No. 11,212,635.

(60) Provisional application No. 62/940,640, filed on Nov. 26, 2019.

(51) Int. Cl.
*H04S 7/00* (2006.01)
*H04R 3/00* (2006.01)

(52) U.S. Cl.
CPC ............... *H04S 7/302* (2013.01); *H04R 3/00* (2013.01)

(58) Field of Classification Search
CPC .... H04R 3/12; H04R 3/00; H04R 5/02; H04S 7/302; H04S 5/00; H04S 7/30; H04S 2420/05
USPC .......................................................... 381/300
See application file for complete search history.

(56) References Cited

U.S. PATENT DOCUMENTS 5,440,644 A 8/1995 Farinelli et al.
5,761,320 A 6/1998 Farinelli et al.
5,923,902 A 7/1999 Inagaki
(Continued)

FOREIGN PATENT DOCUMENTS

EP 1389853 A1 2/2004
EP 1670282 A1 6/2006
(Continued)

OTHER PUBLICATIONS

AudioTron Quick Start Guide, Version 1.0, Mar. 2001, 24 pages.
(Continued)

*Primary Examiner* — Paul Kim
(74) *Attorney, Agent, or Firm* — Fortem IP LLP

(57) ABSTRACT

A method of playing back audio content with improved immersiveness can include receiving, at a playback device, audio input including vertical content having a high-frequency portion and a low-frequency portion. The playback device can face along a first sound axis and comprise an up-firing transducer configured to direct sound along a second sound axis that is vertically angled with respect to the primary sound axis and a side-firing transducer or array configured to direct sound along a third axis that is horizontally angled with respect to the first sound axis. The low-frequency portion of the vertical content can be played back via the side-firing transducer or array, while the high-frequency portion of the vertical content can be played back via the up-firing transducer.

20 Claims, 10 Drawing Sheets

(56) References Cited

U.S. PATENT DOCUMENTS

| | | | |
|---|---|---|---|
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 10,728,666 B2 | 7/2020 | Horbach | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2018/0192224 A1 | 7/2018 | Lee et al. | |
| 2018/0197526 A1* | 7/2018 | Kamdar | H04R 5/02 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability and Written Opinion, mailed on Jun. 9, 2022, issued in connection with International Application No. PCT/US2020/070818, filed on Nov. 24, 2020, 13 pages.
International Bureau, International Search Report and Written Opinion mailed on Feb. 18, 2021, issued in connection with International Application No. PCT/US2020/070818, filed on Nov. 24, 2020, 17 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance mailed on Nov. 10, 2021, issued in connection with U.S. Appl. No. 17/247,029, filed Nov. 24, 2020, 11 pages.
Notice of Allowance mailed on Dec. 14, 2022, issued in connection with U.S. Appl. No. 17/455,830, filed Nov. 19, 2021, 18 pages.
Notice of Allowance mailed on Oct. 14, 2021, issued in connection with U.S. Appl. No. 17/247,029, filed Nov. 24, 2020, 13 pages.
Notice of Allowance mailed on Sep. 14, 2023, issued in connection with U.S. Appl. No. 18/175,045, filed Feb. 27, 2023, 10 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SYSTEMS AND METHODS OF SPATIAL AUDIO PLAYBACK WITH ENHANCED IMMERSIVENESS

CROSS-REFERENCE TO RELATED APPLICATION

The present application is a continuation of U.S. patent application Ser. No. 18/175,045, filed Feb. 27, 2023, now U.S. Pat. No. 11,818,565, which is a continuation of U.S. patent application Ser. No. 17/455,830, filed Nov. 19, 2021, now U.S. Pat. No. 11,627,426, which is a continuation of the U.S. patent application Ser. No. 17/247,029, filed Nov. 24, 2020, now U.S. Pat. No. 11,212,635, which claims the benefit of priority to U.S. Patent Application No. 62/940,640, filed Nov. 26, 2019, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
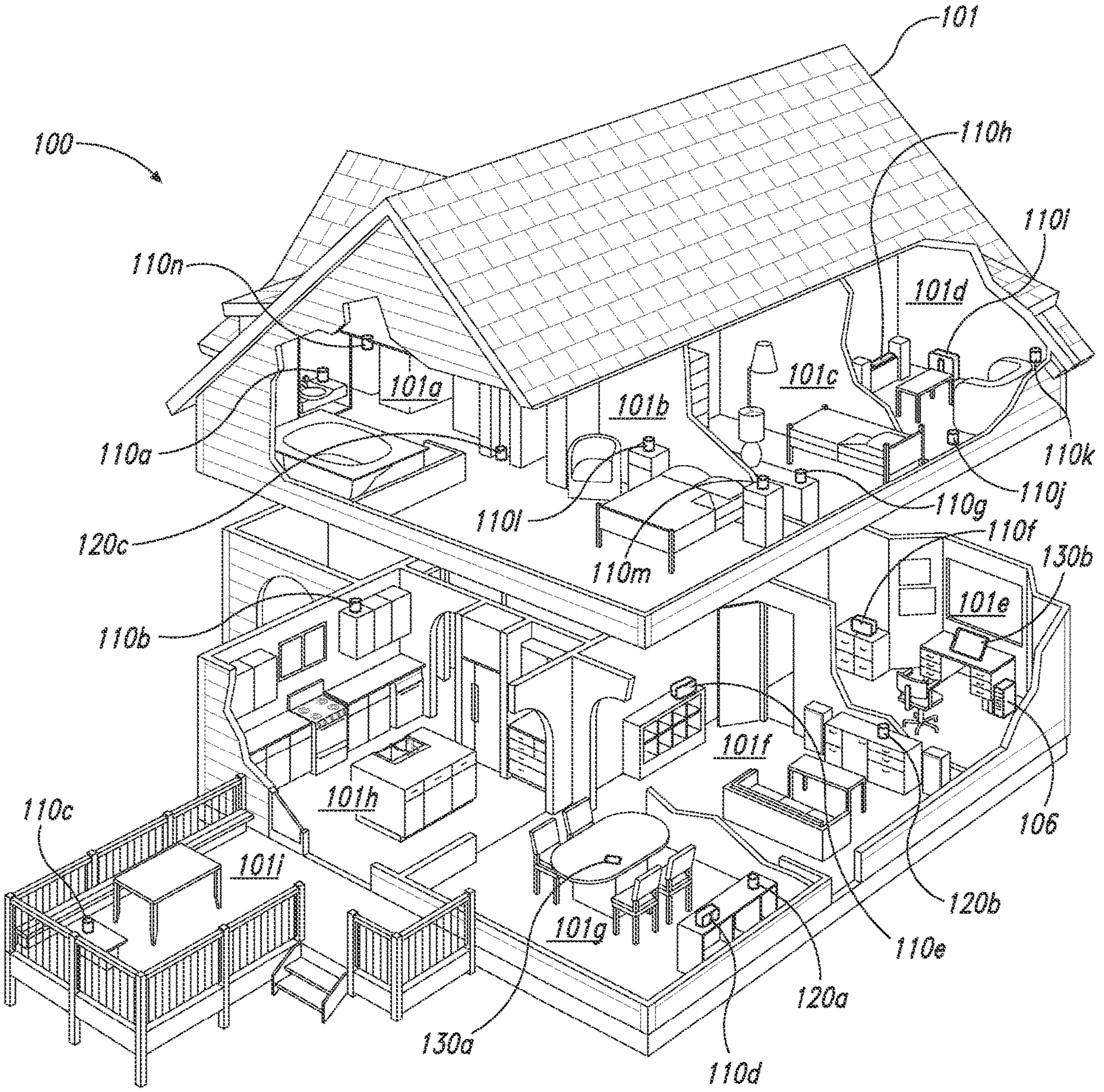
FIG. 1A is a partial cutaway view of an environment having a media playback system configured in accordance with embodiments of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Conventional surround sound audio rendering formats include a plurality of channels configured to represent different lateral positions with respect to a listener (e.g., front, right, left). More recently, three-dimensional (3D) or other immersive audio rendering formats have been developed that include one or more vertical channels in addition to any lateral channels. Examples of such 3D audio formats include DOLBY ATMOS, MPEG-H, and DTS:X formats. Such 3D audio rendering formats may include one or more vertical channels configured to represent sounds originating from above a listener. In some instances, such vertical channels can be played back via transducers positioned over a user's head (e.g., ceiling mounted speakers). In the case of soundbars or other multi-transducer devices, an upwardly oriented transducer (herein referred to as an "up-firing transducer") can output audio along a sound axis that is at least partially vertically oriented with respect to a forward horizontal plane of a playback device. This audio output can reflect off an acoustically reflective surface (e.g., a ceiling) to be directed toward a listener at a target location. Because the listener perceives the audio as originating from point of reflection on the ceiling, the psychoacoustic perception is that the sound originates "above" the listener.

Although up-firing transducers can usefully enable a listener to localize a sound overhead, the effect may be reduced over certain frequency ranges. Many full-range transducers output midrange and lower frequency sound (e.g., sound at approximately 1.5 kHz or less) substantially omnidirectionally, particularly in the case of transducers having relatively small diameter (e.g. 4" or smaller). This may be true even if the transducer outputs high frequency sound (e.g., above 1.5 kHz) in a directional manner. As a result, a vertically oriented up-firing transducer may output audio such that, while a high frequency portion of the output propagates along the vertically oriented axis and reflects off a ceiling to a listener, a low frequency portion of the output propagates omnidirectionally, including along a horizontal axis that propagates directly towards the listener without first reflecting off the ceiling. Since at least some of the low-frequency portion "leaks" along the horizontal direction, the listener's perception of audio output from the up-firing transducer is a combination of the (full-range) output reflected off the ceiling and the low frequency output that propagates horizontally from the up-firing transducer. Moreover, the leaked portion will reach the listener first, since its path length is shorter than that of the reflected output. As a result, the listener may localize the source of the audio output as being the up-firing transducer rather than the reflection point on the ceiling, thereby degrading the immersive audio experience.

Embodiments of the disclosed technology may address this and other shortcomings by directing at least a portion of such vertical audio content to a side-firing transducer (e.g., a transducer configured to output audio primarily along a sound axis that is horizontally angled with respect to a forward horizontal plane of the playback device) or an acoustic array steered away from the listener. Specifically, at least some of the low-frequency portion of the vertical content can be played back via a side-firing transducer or array rather than being played back via the up-firing transducer. Audio played back via the side-firing transducer may propagate along the horizontally angled axis and bounce off an acoustically reflective surface (e.g., a wall) towards the listener. In some embodiments, the low-frequency portion of the vertical content that reaches the listener via the side-firing transducer can have a sound pressure level (SPL) that is at least 6 dB or greater (e.g., 10 dB greater) than the low-frequency portion of the vertical content that reaches the listener from the up-firing transducer via leakage in the horizontal direction. To ensure that the low-frequency content played back via the side-firing transducer and the up-firing transducer reaches the listener substantially simultaneously, playback via the up-firing transducer can be time-aligned with respect to the side-firing transducer. This delay can be configured to compensate for the different path length that the side-firing output takes to reach the listener (e.g., reflecting off the wall and towards a user) as compared to the up-firing transducer output (reflecting off a ceiling and towards the listener).

As a result of outputting at least part of the low-frequency portion of the vertical content via the side-firing transducer, the listener may localize the low-frequency portion of the vertical content as originating from the wall from which the side-firing output has reflected. In some instances, the user's localization can be based on perceiving low-frequency content both from the side-firing transducer (e.g., reflected from the wall) and from the up-firing transducer (e.g., propagating directly horizontally from the up-firing transducer and/or reflecting off a ceiling). In such cases, the user may localize the low-frequency portion of the vertical content at a position somewhere between: (1) the lateral reflection point on the wall, (2) the position of the up-firing transducer, and (3) the vertical reflection point on the ceiling. Depending on the relative contributions of the audio output from these different points, the listener will localize the low-frequency portion of the vertical content at different positions.

When combined with the high-frequency portion of the vertical content (which is reflected towards the listener off the ceiling), the listener's localization of the full-spectrum vertical content can be markedly improved (e.g., with less localization on the playback device itself). The net result is enhanced immersiveness, with the user more reliably localizing vertical audio content at an overhead position, notwithstanding the tendency for low-frequency content to "leak" along the horizontal direction from an up-firing transducer.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some embodiments, a single playback zone may include multiple rooms or spaces. In certain embodiments, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some embodiments, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some embodiments, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
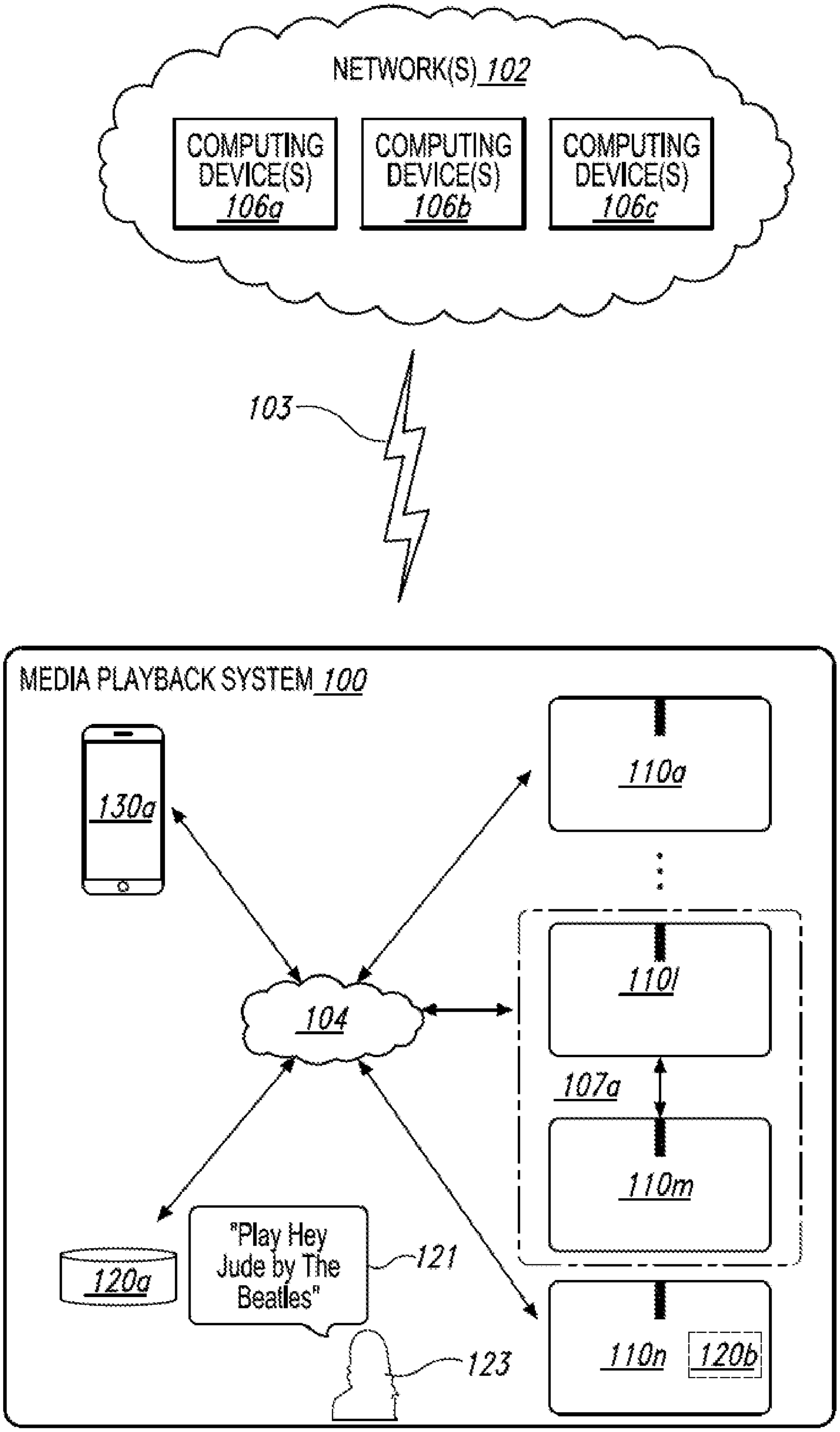
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices.

Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some embodiments, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some embodiments, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
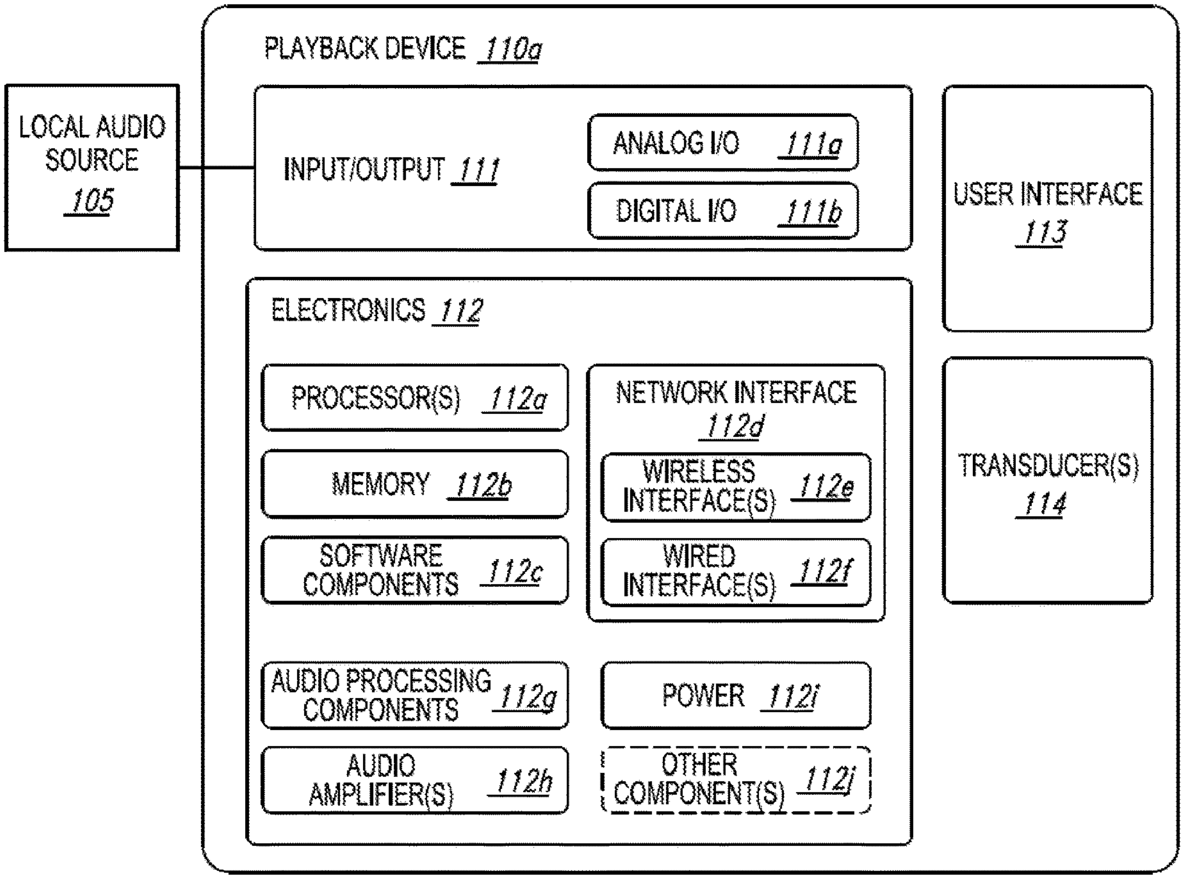
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some embodiments, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some embodiments, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some embodiments, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
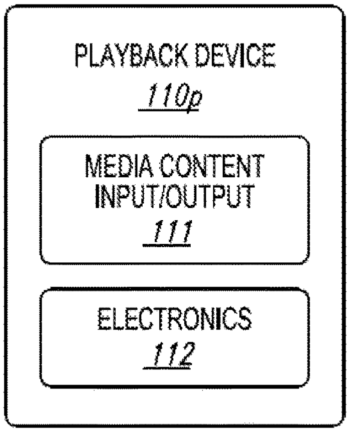
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
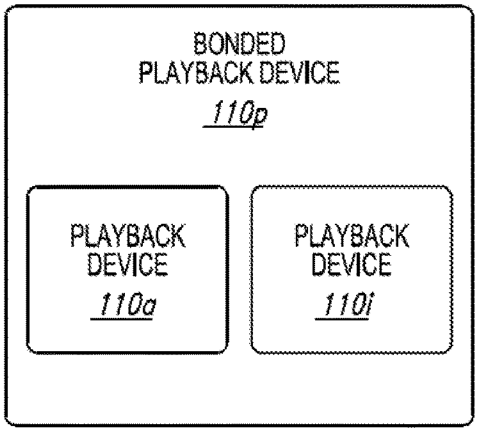
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some embodiments, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-2C.

c. Suitable Network Microphone Devices (NMDs)

Figure 1F:
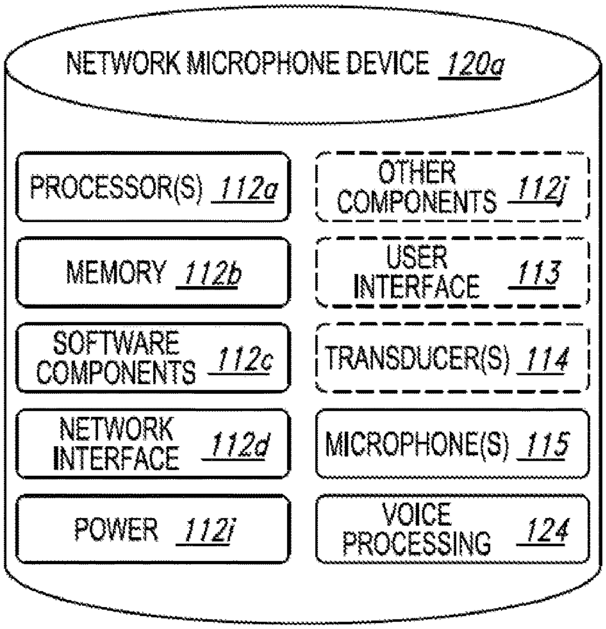
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some embodiments, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
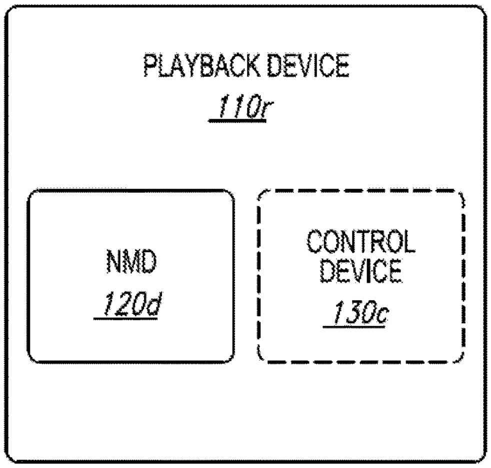
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
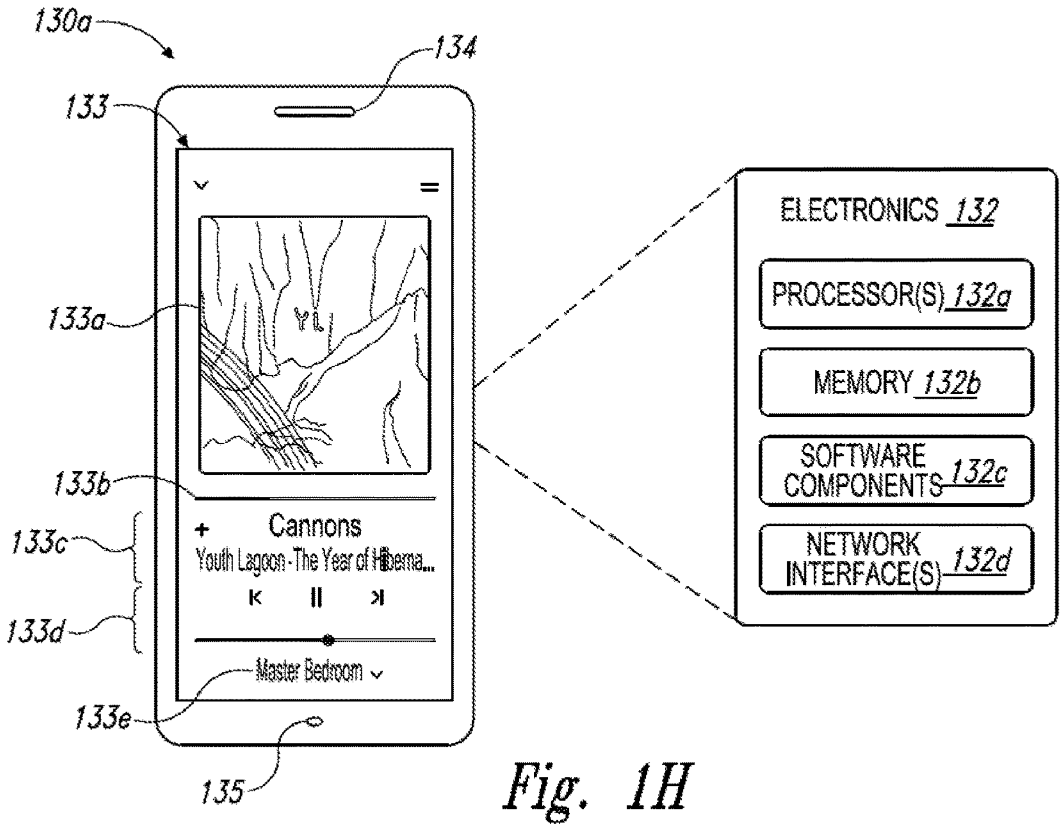
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface **132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110** to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator **133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133** comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device **130*a*. In some embodiments, the one or more speakers comprise individual transducers configured to correspondingly output low frequencies, mid-range frequencies, and/or high frequencies. In some embodiments, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135**.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device **130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133** (e.g., a touch screen) without any speakers or microphones.

III. Example Systems and Devices for Improved Immersiveness

Figure 2A:
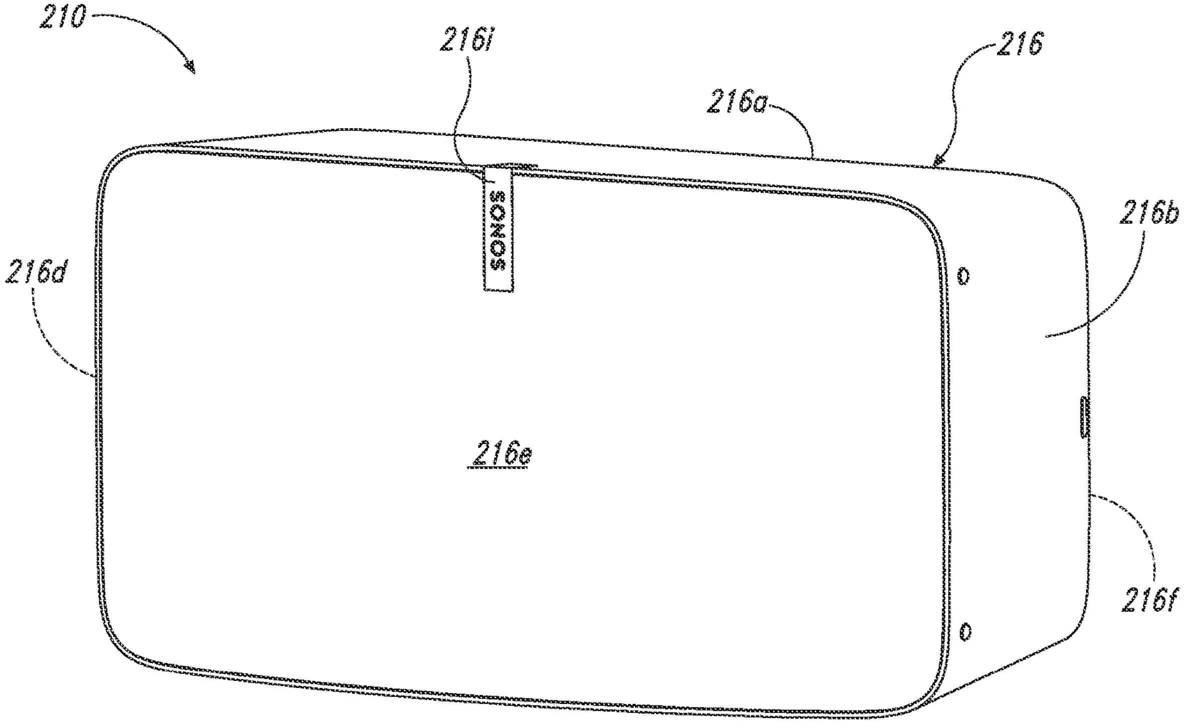
FIG. 2A is a front isometric view of a playback device configured in accordance with embodiments of the disclosed technology.
Figure 2B:
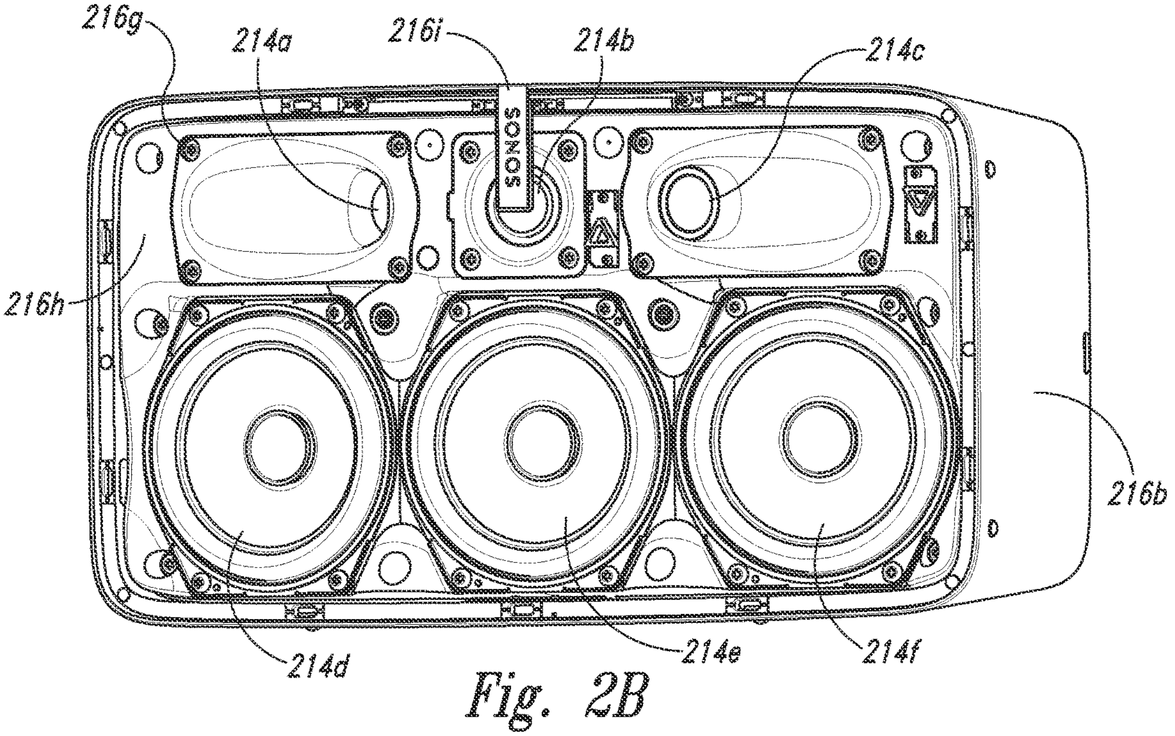
FIG. 2B is a front isometric view of the playback device of FIG. 3A without a grille.
Figure 2C:
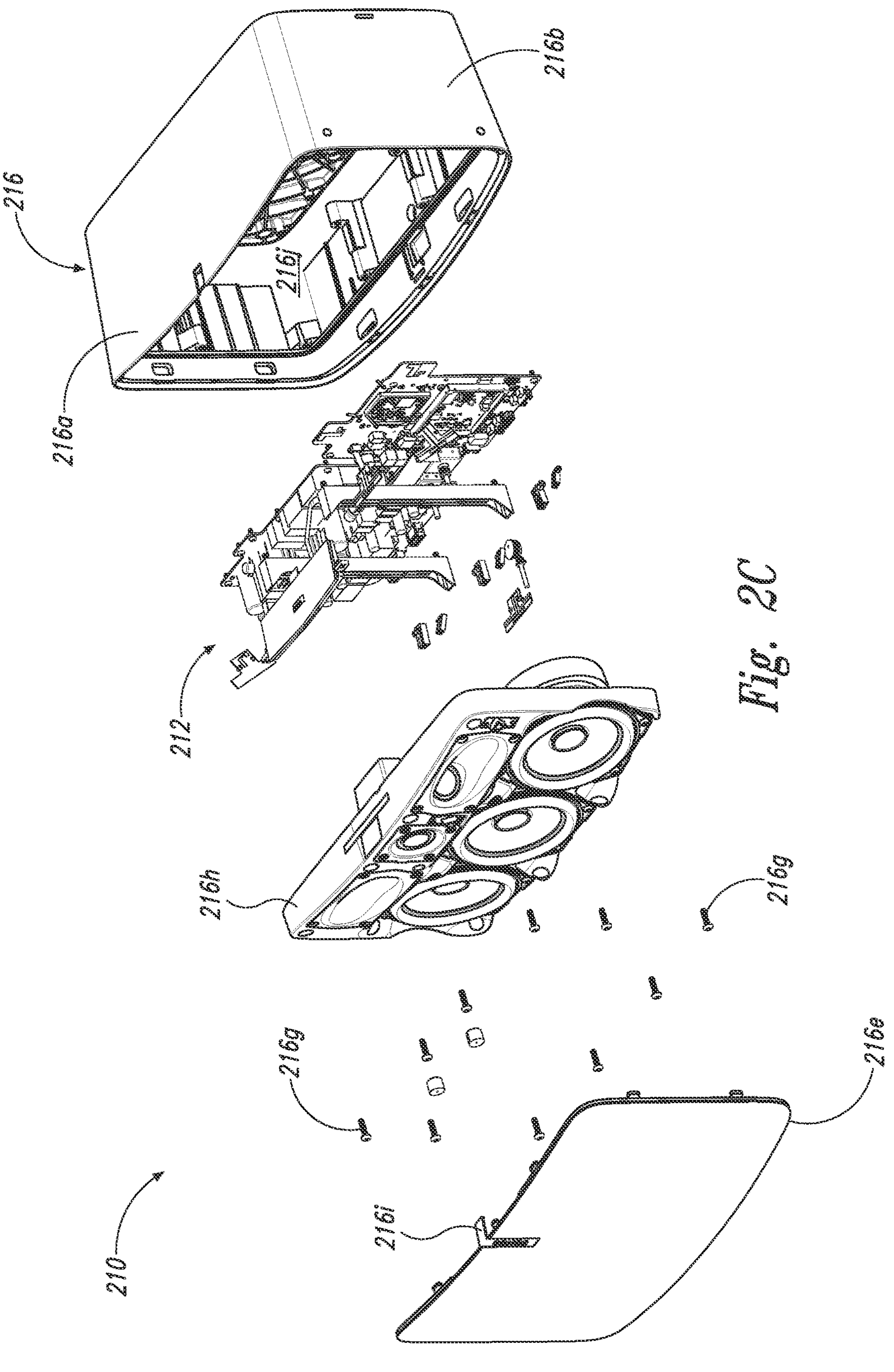
FIG. 2C is an exploded view of the playback device of FIG. 2A.

FIG. 2A is a front isometric view of a playback device 210 configured in accordance with embodiments of the disclosed technology. FIG. 2B is a front isometric view of the playback device 210 without a grille **216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214** for playback.

The transducers 214 are configured to receive the electrical signals from the electronics 112, and further configured to convert the received electrical signals into audible sound during playback. For instance, the transducers **214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210**.

In the illustrated embodiment of FIGS. 2A-2C, a filter **216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214**.

Figure 3A:
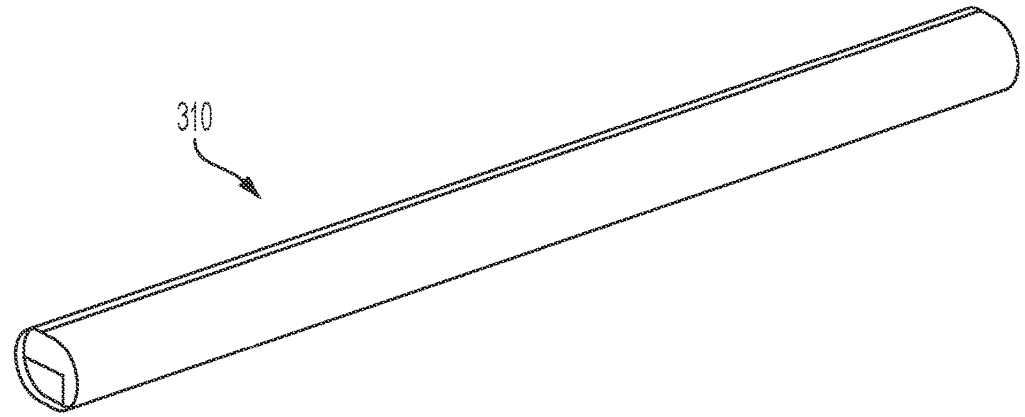
FIG. 3A is a perspective view of a playback device configured in accordance with embodiments of the disclosed technology.
Figure 3B:
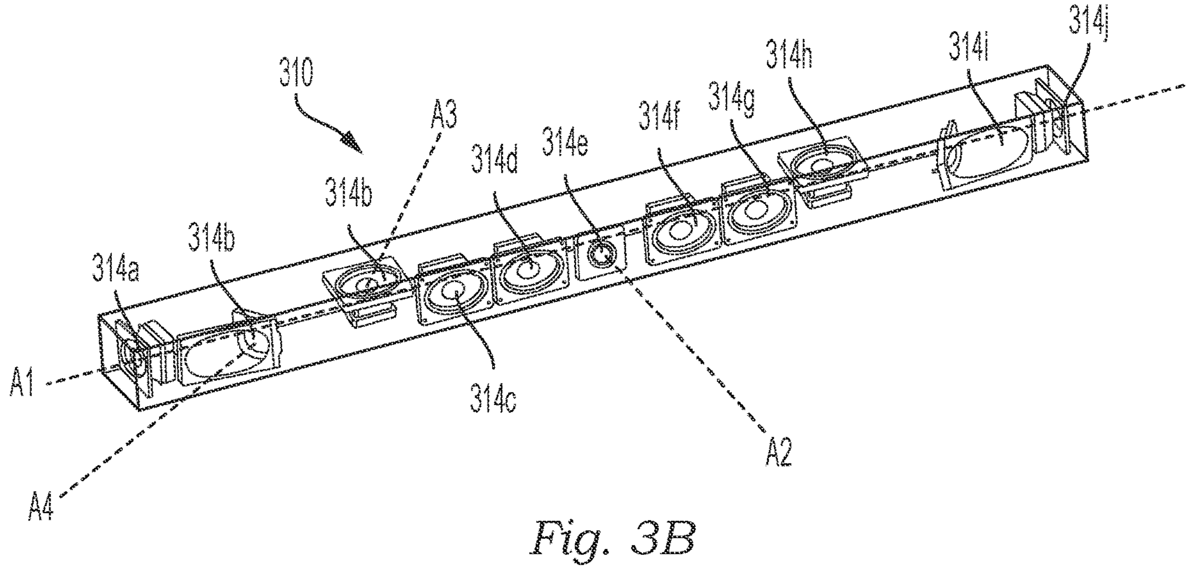
FIG. 3B is a transparent view of the playback device of FIG. 3A illustrating individual transducers.

FIG. 3A is a perspective view of a playback device 310, and FIG. 3B shows the device 310 with the outer body drawn transparently to illustrate the plurality of transducers **314*a*—j therein (collectively "transducers 314"). The transducers 314 can be similar or identical to any one of the transducers 214*a*—f described previously. In this example, the playback device 310 takes the form of a soundbar that is elongated along a horizontal axis A1 and is configured to face along a primary sound axis A2 that is substantially orthogonal to the first horizontal axis A1. In other embodiments, the playback device 310 can assume other forms, for example having more or fewer transducers, having other form-factors, or having any other suitable modifications with respect to the embodiment shown in FIGS. 3A and 3**B.

The playback device 310 can include individual transducers 314*a-j* oriented in different directions or otherwise configured to direct sound along different sound axes. For example, the transducers 314*c*—g can be configured to direct sound primarily along directions parallel to the primary sound axis A2 of the playback device 310. Additionally, the playback device 310 can include left and right up-firing transducers (e.g., transducers 314*b* and 314*h*) that are configured to direct sound along axes that are angled vertically with respect to the primary sound axis A2. For example, the left up-firing transducer 314*b* is configured to direct sound along the axis A3, which is vertically angled with respect to the horizontal primary axis A2. In some embodiments, the up-firing sound axis A3 can be angled with respect to the primary sound axis A2 by between about 50 degrees and about 90 degrees, between about 60 degrees and about 80 degrees, or about 70 degrees.

The playback device 310 can also include one or more side-firing transducers (e.g., transducers 314*a*, 314*b*, 314*i*, and 314*j*), which can direct sound along axes that are horizontally angled with respect to the primary sound axis A2. In the illustrated embodiment, the outermost transducers 314*a* and 314*j* can be configured to direct sound primarily along the first horizontal axis A1 or at least partially horizontally angled therefrom, while the side-firing transducers 314*b* and 314*i* are configured to direct sound along an axis that lies between the axes A1 and A2. For example, the left side-firing transducer 314*b* is configured to direct sound along axis A4.

In operation, the playback device 310 can be utilized to play back 3D audio content that includes a vertical component. As noted previously, certain 3D audio or other immersive audio formats include one or more vertical channels in addition to any lateral (e.g., left, right, front) channels. Examples of such 3D audio formats include DOLBY ATMOS, MPEG-H, and DTS:X formats.

Figure 4:
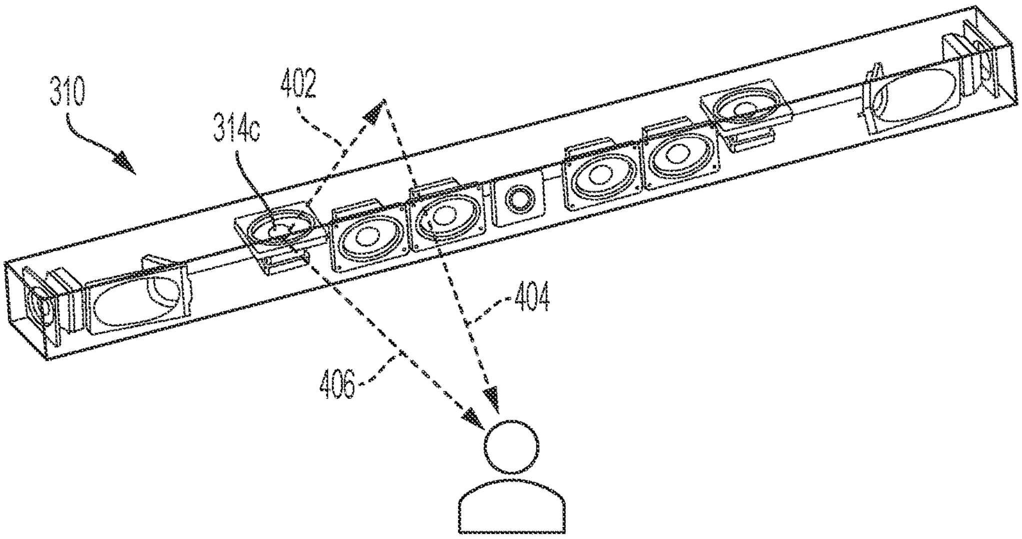
FIGS. 4 and 5 are schematic illustrations of audio playback in accordance with embodiments of the disclosed technology.

FIG. 4 schematically illustrates playback of vertical audio content via the playback device 310. As illustrated, the left up-firing transducer 314*c* can direct sound output 402 along the vertically oriented axis. This output 402 can reflect off an acoustically reflective surface (e.g., a ceiling), after which the reflected output 404 reaches the listener at a target location. Because the listener perceives the audio output 404 as originating from point of reflection on the ceiling, the psychoacoustic perception is that the sound is "above" the listener. However, this effect may be reduced over certain frequency ranges, as full-range transducers may tend to output low frequency sound (e.g., sound at approximately 1.5 kHz or less) substantially omnidirectionally. This is particularly true in the case of transducers having relatively small drivers (e.g., in contrast to subwoofers, which can be more directional than tweeters, even at low frequency ranges). Such transducers may output low-frequency audio substantially omnidirectionally even if the transducers output high frequency sound (e.g., above 1.5 kHz) in a highly directional manner. As a result, the left up-firing transducer 314*c* may output audio such that, while a high frequency portion of the output propagates along the vertically oriented axis as output 402 and reflects off a ceiling as output 404 to a listener, a low frequency portion of the output propagates omnidirectionally, including along a horizontal axis that propagates directly towards the listener without first reflecting off the ceiling (e.g., as output 406 in FIG. 4). Since at least some of the low-frequency portion "leaks" along the horizontal direction as output 406, the user's perception of audio output from the up-firing transducer 314*c* is a combination of the (full-range) ceiling-reflected output 404 and the low-frequency output 406. Moreover, the leaked output 406 will reach the user first, since its path length is shorter than that of the reflected output (output 402 and 404 together). As a result, the listener may localize the source of the audio output as being the up-firing transducer 314*c* rather than the reflection point on the ceiling, thereby undermining the immersiveness of the 3D audio.

Figure 5:
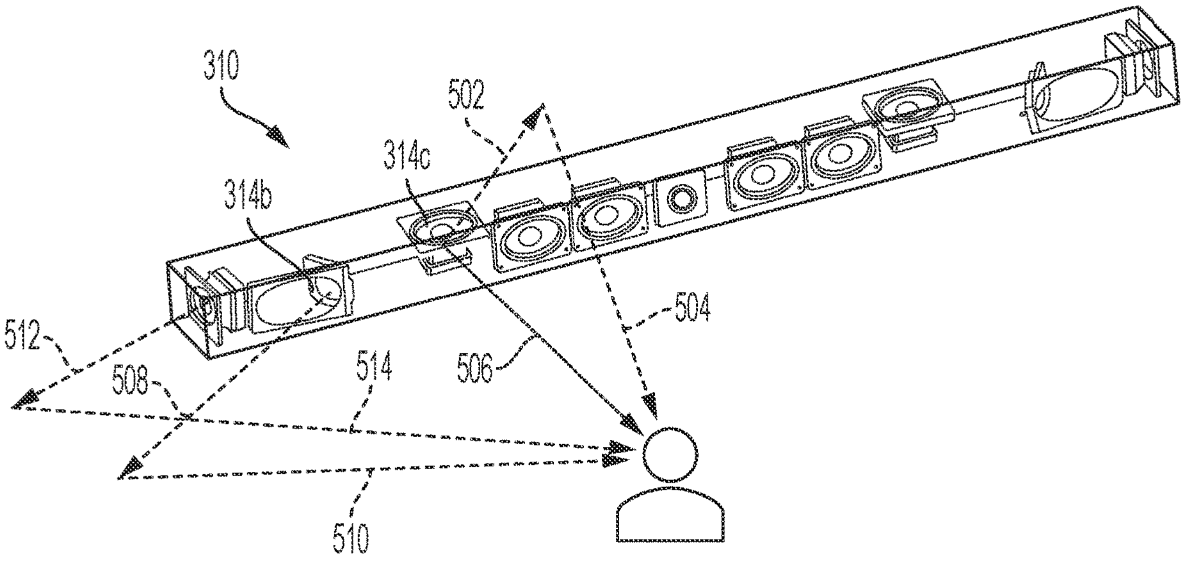

As best seen in FIG. 5, in some embodiments these undesirable effects can be ameliorated by directing at least a portion of such vertical audio content to a side-firing transducer (e.g., a side-firing transducers 314*a* or 314*b*, or a side-firing beam-steered array). Specifically, at least some of the low-frequency portion of the vertical content can be played back via the side-firing transducer 314*a* and/or 314*b* rather than being played back via the up-firing transducer 314*c*. In various embodiments, the low-frequency portion of the vertical content can include that portion of the vertical content that has a frequency of approximately 1.0 kHz or less, 1.1 kHz or less, 1.2 kHz or less, 1.3 kHz or less, 1.4 kHz or less, 1.5 kHz or less, 1.6 kHz or less, 1.7 kHz or less, 1.8 kHz or less, 1.9 kHz or less, or 2.0 kHz or less.

As shown in FIG. 5, audio played back via the side-firing transducer 314*b* may propagate along the horizontally angled axis as output 508. This output may bounce off an acoustically reflective surface (e.g., a wall) towards the listener as reflected output 510. Similarly, audio played back via the side-firing transducer 314*a* may propagate along a different axis as output 512 and be reflected off a wall or other surface towards the listener as reflected output 514. This can occur simultaneously with output from the up-firing transducer 314*c*, which is emitted along the vertically oriented sound axis as output 502 and reflected off the ceiling or other surface as reflected output 504 towards the listener. While there may remain a low-frequency leaked output 506 that propagates horizontally from the up-firing transducer 314*c*, this leaked output 506 can be reduced in magnitude as compared to the example of FIG. 4, since at least some of the low-frequency portion of the vertical content has been routed instead to the side-firing transducers 314*a* and/or 314*b*.

In some embodiments, the reflected outputs 510 and 514 (e.g., the low-frequency portion of the vertical content that reaches the listener via the side-firing transducers 314*a* and/or 314*b*) can have a sound pressure level (SPL) that is greater than the SPL of the leaked output 506. For example, in various embodiments, the SPL of the reflected output 510 and/or output 514 can be at least 5 dB, 6 dB, 7 dB, 8 dB, 9 dB, 10 dB, 11 dB 12 dB, 13 dB, 14 dB, 15 dB, 20 dB, 30 dB, 40 dB, or 50 dB greater than the leaked output 506 (e.g., the low-frequency portion of the vertical content that reaches the listener via horizontal propagation from the up-firing transducer 314*c*).

To ensure that the reflected output 510 (e.g., the low-frequency content played back via the side-firing transducer 314*b*) and the reflected output 504 (e.g., the full-frequency content played back via the up-firing transducer 314*c*) reach the listener substantially simultaneously, playback of the full-frequency content via the up-firing transducer 314*c* can be time-aligned (e.g. delayed or advanced) with respect to the side-firing transducer 314*b* or array at the listening position. This time alignment can be configured to compensate for the different path length that the side-firing output takes to reach the listener (e.g., the combination of output 508 and 510—reflecting off the wall and towards the listener) as compared to the up-firing transducer output (e.g., the combination of output 502 and 504—reflecting off the ceiling and towards the listener). In some embodiments, only the low-frequency portion of the audio content is delayed for playback via the up-firing transducer 314*c* as compared to the side-firing transducer 314*b*.

As a result of outputting at least part of the low-frequency portion of the vertical content via the side-firing transducers 314*a* and/or 314*b* or a side-firing array, the listener may localize the low-frequency portion of the vertical content as originating from the wall from which the side-firing output has reflected. In some instances, the user's localization of the output can be based on perceiving low-frequency content both from the side-firing transducer (e.g., reflected outputs 510, 514) and from the up-firing transducer (e.g., reflected output 504). In such cases, the user may localize the low-frequency portion of the vertical content at a position somewhere between: (1) the lateral reflection point on the wall (i.e., the origins of reflected outputs 510, 514), (2) the position of the up-firing transducer 314*c*, and (3) the vertical reflection point on the ceiling (i.e., the origin of reflected output 504). Depending on the relative contributions of the audio output from these different points, the listener may localize the low-frequency portion of the vertical content at different positions. When combined with the high-frequency portion of the vertical content (which is reflected towards the listener off the ceiling as output 504), the listener's localization of the full-spectrum vertical content can be markedly improved, resulting in enhanced immersiveness, with the listener more reliably localizing vertical audio content at an overhead position, notwithstanding the tendency for low-frequency content to leak along the horizontal direction as output 506.

Although the side-firing transducers 314*a* and/or 314*b* has been described above as providing output of at least a low-frequency portion of the vertical content, in some embodiments the side-firing transducers 314*a* and/or 314*b* may also provide other output, for example output assigned to a side channel. In some embodiments, the low-frequency portion of the vertical content to be played back via the side-firing transducers 314*a* and/or 314*b* can be combined with the side channel content to be played back via the side-firing transducers 314*a* and/or 314*b*, and the combined inputs can be delivered to the side-firing transducers 314*a* and/or 314*b* for playback.

Figure 6:
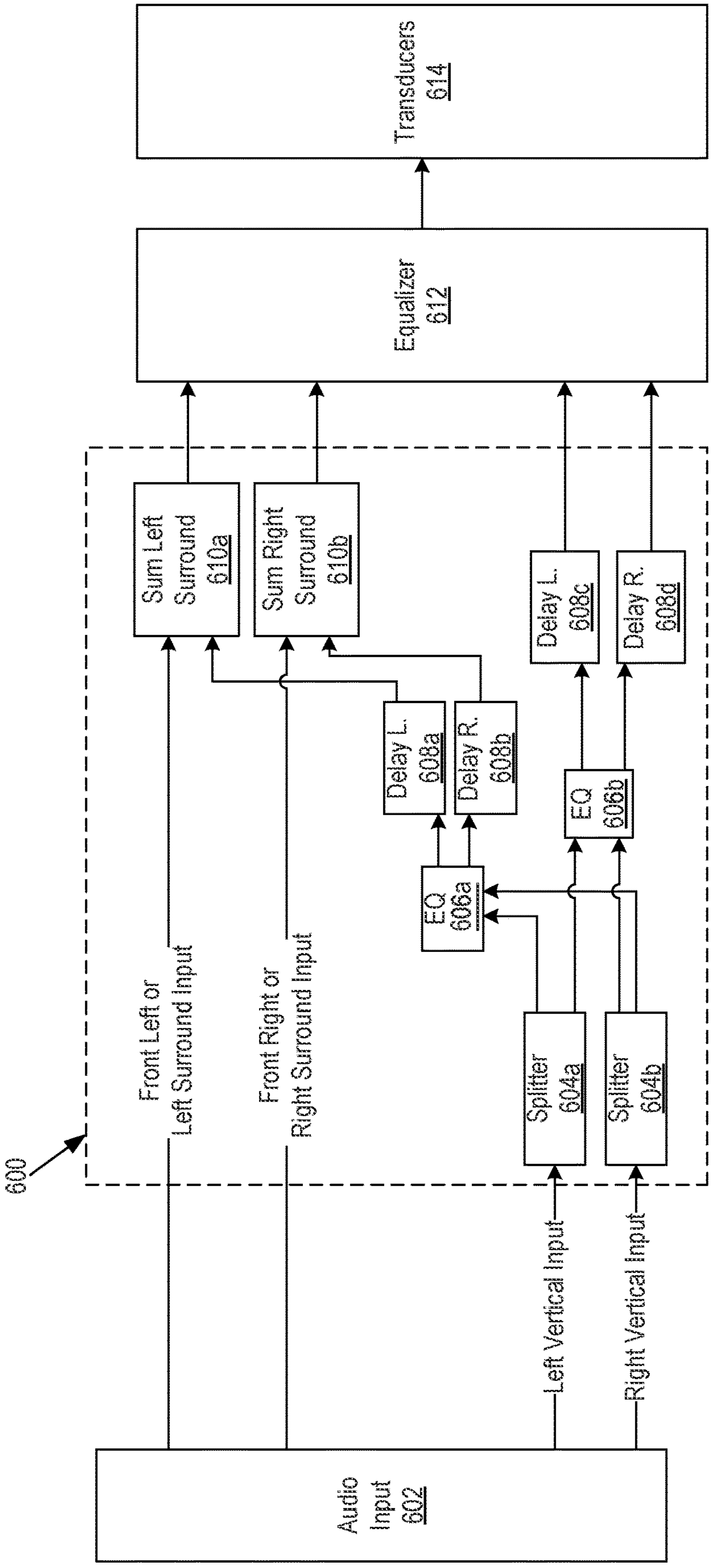
FIG. 6 is a schematic block diagram of a signal processing scheme for audio playback in accordance with embodiments of the disclosed technology.

FIG. 6 is a schematic block diagram of a signal processing scheme for audio playback. The blocks illustrated in FIG. 6 can be implanted using digital or analog components or any combination thereof. As illustrated, audio input 602 can be provided to an audio processing module 600. The audio input 602 can include a plurality of channels, which may vary depending on the particular audio rendering format in use. In the illustrated example, the audio input 602 includes a left surround input, a right surround input, a left vertical input, and a right vertical input. In various embodiments, the audio input 602 can include more or fewer channels, and may conform to any suitable audio standard (e.g., DOLBY ATMOS, MPEG-H, or DTS:X).

The left vertical input and right vertical input can each be directed to respective splitters 604*a* and 604*b*. These splitters may divide the respective input, sending a first portion to a first equalizer 606*a* for output via side-firing transducers or arrays and a second portion to a second equalizer 606*b* for output via up-firing transducers. In some embodiments, the splitters 604*a*—b can be configured such that a high-frequency portion of the input is delivered only to the second equalizer 606*b* for output via up-firing transducers. Meanwhile, the splitters 604*a*—b may be configured such that low-frequency portions of the inputs are divided between the first equalizer 606*a* (for ultimate playback via side-firing transducers) and the second equalizer 606*b* (for ultimate playback via the up-firing transducers). In some embodiments, the splitters 604*a*—b can be configured such that at least 30%, at least 40%, at least 50%, at least 60%, at least 70%, at least 80%, or at least 90% of the low-frequency portions of the inputs are delivered to the first equalizer 606*a*, while a remainder of the low-frequency portions of the inputs are delivered to the second equalizer 606*b*. In some embodiments, the amplitude of the low-frequency portions that are delivered to the first equalizer can be greater than the amplitude of the low-frequency portions that are delivered to the second equalizer 606*b* by a factor of 1.25, 1.5, 1.75, 2, 3, 4, or 5.

In various embodiments, the demarcation between the low-frequency and high-frequency portions of the vertical inputs can be selected to achieve the desired effects. For example, in some embodiments, the low-frequency portions include vertical audio input having a frequency of approximately 1.0 kHz or less, 1.1 kHz or less, 1.2 kHz or less, 1.3 kHz or less, 1.4 kHz or less, 1.5 kHz or less, 1.6 kHz or less, 1.7 kHz or less, 1.8 kHz or less, 1.9 kHz or less, or 2.0 kHz or less, or higher if desired. In some embodiments, the high-frequency portions can include the vertical audio inputs having a frequency above that of the low-frequency portions (e.g., approximately 1.0 kHz or greater, 1.1 kHz or greater, 1.2 kHz or greater, 1.3 kHz or greater, 1.4 kHz or greater, 1.5 kHz or greater, 1.6 kHz or greater, 1.7 kHz or greater, 1.8 kHz or greater, 1.9 kHz or greater, or 2.0 kHz or greater).

The first equalizer 606*a* may modulate the signals (e.g., to ensure the inputs originating from the left and right input channels are balanced or to make any other suitable adjustments) and provide output signals to right and left delay blocks 608*a* and 608*b*. These delay blocks 608*a* and 608*b* can implement programmed delays of predetermined amounts of time before the signals are passed to blocks 610*a* and 610*b*, respectively, to sum with the left surround input channel and right surround input channel, respectively. The outputs of these summing blocks 610*a* and 610*b* can then be passed to a global equalizer 612 and then to the individual transducers 614 or arrays. In some embodiments, the output of the left surround sum block 610*a* can be output in whole or in part via a left side-firing transducer (e.g., transducer 314*b* of FIG. 3B) and the right surround sum block 610*b* can be output in whole or in part via a right side-firing transducer (e.g., transducer 314*i* of FIG. 3B).

Output from the second equalizer 606*b* can be provided to second left and right delay blocks 608*c* and 608*d*, which can implement a predetermined time delay before the signals are passed to the global equalizer 612 and then to the individual transducers 614. In some embodiments, the output of the left delay block 608*c* can be output via a left up-firing transducer (e.g., transducer 314 of FIG. 3A) and the output of the right delay block 608*d* can be played back via a right up-firing transducer (e.g., transducer 314*h* of FIG. 3B).

As a result of the operation of splitters 604*a* and 604*b*, the output delivered to up-firing transducers (e.g., output of left delay block 608*c* and right delay block 608*d*) can include the full frequency range of the left and vertical inputs, but may have a reduced level of low-frequency signals. Meanwhile, the outputs provided to side-firing transducers or arrays (e.g., the output of left surround sum block 610*a* and right surround sum block 610*b*) can include both the left and right surround inputs, respectively, and at least part of the low-frequency portion of the right and left vertical inputs, respectively. Accordingly, playback of the low-frequency portions of the left and right vertical inputs can be divided between up-firing transducers and side-firing transducers or arrays.

In some embodiments, the various delay blocks 608*da*—d can have delays selected such that low-frequency content played back via side-firing transducers (e.g., included in the outputs of left surround sum block 610*a* and right surround sum block 610*b*) reaches a listener substantially simultaneously with output from the up-firing transducers (e.g., the output of left delay block 608*c* and right delay block 608*d*). As described previously herein, the path length from a playback device to a listener for low-frequency content from side-firing transducers may be different than the path length for low-frequency content from an up-firing transducer. Accordingly, the delay blocks 608*c* and 608*d* can be configured to delay their outputs with respect to outputs from the right and left surround sum blocks 610*a*, 610*b*. In some embodiments, the delay can be reversed, such that the side-firing transducer output lags with respect to the up-firing transducer output.

In some embodiments, the audio processing module 600 can be dynamically modified based on feedback. For example, one or more microphones disposed at or near a target listening area may be used to detect sounds output by the transducers. Based on the detected output sounds, the operation of the audio processing module 600 may be modified. For example, the splitters 604*a*—b may be modified to direct more or less of the low-frequency portion of the vertical input towards side-firing transducers (e.g., towards the first equalizer 606*a*). Additionally or alternatively, the delays provided by delay blocks 608*a*—d can be modified, for example to increase or decrease the relative delays between the low-frequency portion played back via the side-firing transducers and the (full frequency) output played back via the up-firing transducers. Such dynamic updating can be beneficially used to tailor operation of the system to the particular room dimensions, target listening location, or other acoustic properties of the environment. For example, the ceiling height, listener distance, and other dimensions can alter the relative path lengths of output from the side-firing transducers and up-firing transducers. Accordingly, depending on the particular dimensions and other aspects of the environment, the particular parameters of the audio processing module 600 may be modified to achieve the desired psychoacoustic effects and improved immersiveness for the listener.

Figure 7:
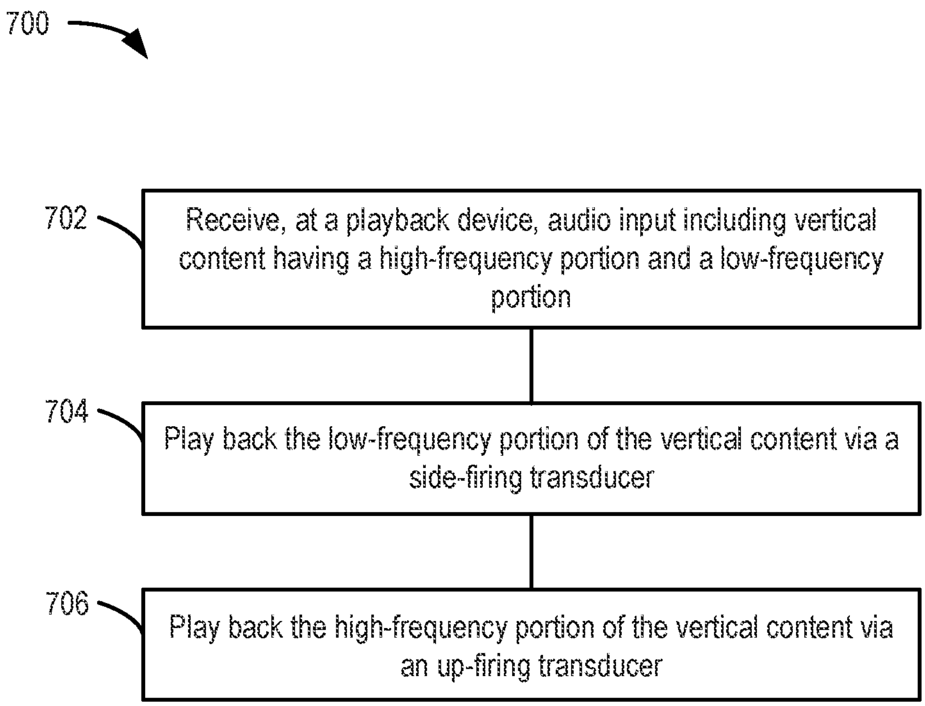
FIG. 7 is a flow diagram of a process for playing back audio in accordance with embodiments of the disclosed technology.

FIG. 7 is a flow diagram of a process 700 for playing back audio. In some embodiments, the process 700 includes one or more instructions stored in memory (e.g., the memory 112*b* of FIG. 1) and executed by one or more processors (e.g., the processor 112*a* of FIG. 1) of a playback device (e.g., the playback device 310 of FIGS. 3A and 3B).

The process 700 includes receiving, at a playback device, audio input including vertical content having a high-frequency portion and a low-frequency portion (process portion 702). The audio input can include any suitable audio format that includes a vertical component, such as DOLBY ATMOS, MPEG-H, DTS:X, or any other suitable 3D or other immersive audio format. In various embodiments, the demarcation between high-frequency and low-frequency content can be varied as desired. For example, in some embodiments, the low-frequency portion includes vertical audio content having a frequency of approximately 1.0 kHz or less, 1.1 kHz or less, 1.2 kHz or less, 1.3 kHz or less, 1.4 kHz or less, 1.5 kHz or less, 1.6 kHz or less, 1.7 kHz or less, 1.8 kHz or less, 1.9 kHz or less, or 2.0 kHz or less. In some embodiments, the high-frequency portion can include the vertical audio content having a frequency above that of the low-frequency portion (e.g., approximately 1.0 kHz or greater, 1.1 kHz or greater, 1.2 kHz or greater, 1.3 kHz or greater, 1.4 kHz or greater, 1.5 kHz or greater, 1.6 kHz or greater, 1.7 kHz or greater, 1.8 kHz or greater, 1.9 kHz or greater, or 2.0 kHz or greater).

The process 700 continues in process portion 704 with playing back the low-frequency portion of the vertical content via a side-firing transducer. Such a side-firing transducer can be configured to output sound along an axis horizontally angled with respect to a primary forward axis of the playback device. In operation, such output can be configured to reflect off a lateral acoustic reflective surface (e.g., a wall) and reflect towards a listener, such that the listener perceives such output as originating from the listener's left or right side.

In process portion 706, the high-frequency portion of the vertical content is played back via an up-firing transducer. Such an up-firing transducer can be configured to output sound along an axis vertically angled with respect to a primary forward axis of the playback device. In operation, such output can be configured to reflect off an overhead acoustic reflective surface (e.g., a ceiling) towards a listener, such that the listener perceives such output as originating from above. As described previously, because at least some of the low-frequency vertical content has been routed through the side-firing transducer rather than the up-firing transducer, the amount of leaked low-frequency content that propagates horizontally from the up-firing transducer can be reduced, thereby enhancing the immersiveness of the listener's experience.

Although several embodiments disclosed herein refer to routing at least a portion of vertical content to a side-firing transducer, in some embodiments at least a portion of vertical content can be routed multiple different transducers, some or all of which can be side-firing. Additionally, in some embodiments side channel input can be routed to other transducers, such as up-firing transducers. In some embodiments, audio input for any channel can be routed in whole or in part to any transducer so as to achieve the desired psychoacoustic effect.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software embodiments or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring embodiments of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various embodiments described below. Various examples of embodiments of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Clause 1. A method of playing back audio content comprising: receiving, at a playback device, audio input including vertical content having a high-frequency portion and a low-frequency portion, the playback device facing along a first sound axis, the playback device comprising: an up-firing transducer configured to direct sound along a second sound axis that is vertically angled with respect to the primary sound axis; and a side-firing transducer or array configured to direct sound along a third axis that is horizontally angled with respect to the first sound axis; playing back the low-frequency portion of the vertical content via the side-firing transducer; and playing back the high-frequency portion of the vertical content via the up-firing transducer, optionally also playing back the low-frequency portion of the vertical content via the up-firing transducer.

Clause 2. The method of Clause 1, wherein, at a target listening location, a sound pressure level of the low-frequency portion played back via the side-firing transducer or array is at least 6 dB greater than a sound pressure level of the low-frequency portion played back via the up-firing transducer.

Clause 3. The method of Clause 2, wherein the target listening location is positioned along first sound axis.

Clause 4. The method of any one of the previous Clauses, wherein playing back the vertical content via the up-firing transducer is time-aligned or delayed with respect to playing back the low-frequency portion of the vertical content via the side-firing transducer.

Clause 5. The method of any one of the previous Clauses, wherein: playing back the vertical content via the up-firing transducer comprises reflecting the vertical content off an acoustically reflective surface and towards a target listening location; and playing back the low-frequency portion of the vertical content via the side-firing transducer comprises reflecting the low-frequency portion of the vertical content off a second acoustically reflective surface and towards the target listening location.

Clause 6. The method of any one of the previous Clauses, wherein: at least some of the low-frequency portion of the vertical content played back via the up-firing transducer propagates along a first direction parallel to the first sound axis towards a target listening location; playing back the low-frequency portion of the vertical content via the side-firing transducer comprises reflecting the low-frequency portion off an acoustically reflective surface and towards the target listening location; and playing back the vertical content via the up-firing transducer is delayed such that the low-frequency portion of the vertical content played back via the up-firing transducer and propagating along the first direction reaches the target listening location substantially simultaneously with the low-frequency portion of the vertical content played back via the side-firing transducer and reflected off the acoustically reflective surface.

Clause 7. The method of any one of the previous Clauses, wherein the audio input comprises at least one of: 3D audio input, MPEG-H audio input, Dolby ATMOS audio input; DTS:X audio input, or the output of an upmixer to create immersive content.

Clause 8. The method of any one of the previous Clauses, wherein the low-frequency portion comprises signals having a frequency of less than about 2000 Hz.

Clause 9. A playback device configured to face along a first sound axis, the device comprising: an up-firing transducer configured to direct sound along a second sound axis that is vertically angled with respect to the first sound axis of the playback device; a side-firing transducer or array configured to direct sound along a third axis that is horizontally angled with respect to the first sound axis; one or more processors; and tangible, non-transitory computer-readable medium storing instructions that, when executed by the one or more processors, cause the playback device to perform operations comprising: receiving, at the playback device, audio input including vertical content having a high-frequency portion and a low-frequency portion; playing back the low-frequency portion of the vertical content via the side-firing transducer or array; and playing back the high-frequency portion of the vertical content via the up-firing transducer, and optionally also playing back the low-frequency portion of the vertical content via the up-firing transducer.

Clause 10. The playback device of Clause 9, wherein the device is configured such that, at a target listening location, a sound pressure level of the low-frequency portion played back via the side-firing transducer is at least 6 dB greater than a sound pressure level of the low-frequency portion played back via the up-firing transducer.

Clause 11. The playback device of Clause 10, wherein the intended listening location is positioned along first sound axis.

Clause 12. The playback device of any one of the previous Clauses, wherein playing back the vertical content via the up-firing transducer is delayed with respect to playing back the low-frequency portion of the vertical content via the side-firing transducer.

Clause 13. The playback device of any one of the previous Clauses, wherein the device is configured such that at least some of the low-frequency portion of the vertical content played back via the up-firing transducer propagates along a first direction parallel to the first sound axis towards a target listening location, wherein playing back the low-frequency portion of the vertical content via the side-firing transducer comprises reflecting the low-frequency portion off an acoustically reflective surface and towards the target listening location, and wherein playing back the vertical content via the up-firing transducer is delayed such that the low-frequency portion of the vertical content played back via the up-firing transducer and propagating along the first direction reaches the target listening location substantially simultaneously with the low-frequency portion of the vertical content played back via the side-firing transducer and reflected off the acoustically reflective surface.

Clause 14. The playback device of any one of the previous Clauses, wherein the audio input comprises at least one of: 3D audio input, MPEG-H audio input, Dolby ATMOS audio input; DTS:X audio input, or output of an upmixer to create immersive content.

Clause 15. The playback device of any one of the previous Clauses, wherein the low-frequency portion comprises signals having a frequency of less than about 2000 Hz.

Clause 16. Tangible, non-transitory computer-readable medium storing instructions that, when executed by the one or more processors of a playback device, cause the playback device to perform operations comprising: receiving, at the playback device, audio input including vertical content having a high-frequency portion and a low-frequency portion; playing back the low-frequency portion of the vertical content via a side-firing transducer or array of the playback device; and playing back the high-frequency portion of the vertical content via an up-firing transducer of the playback device, optionally also playing back the low-frequency portion of the vertical content via the up-firing transducer.

Clause 17. The computer readable medium of any one of the previous Clauses, wherein playing back the vertical content via the up-firing transducer is delayed with respect to playing back the low-frequency portion of the vertical content via the side-firing transducer or array.

Clause 18. The computer readable medium of any one of the previous Clauses, wherein: at least some of the low-frequency portion of the vertical content played back via the up-firing transducer propagates along a first direction parallel to the first sound axis towards a target listening location; playing back the low-frequency portion of the vertical content via the side-firing transducer comprises reflecting the low-frequency portion off an acoustically reflective surface and towards the target listening location; and playing back the vertical content via the up-firing transducer is delayed such that the low-frequency portion of the vertical content played back via the up-firing transducer and propagating along the first direction reaches the target listening location substantially simultaneously with the low-frequency portion of the vertical content played back via the side-firing transducer and reflected off the acoustically reflective surface.

Clause 19. The computer readable medium of any one of the previous Clauses, wherein the audio input comprises at least one of: 3D audio input, MPEG-H audio input, Dolby ATMOS audio input; or DTS:X audio input.

Clause 20. The computer readable medium of any one of the previous Clauses, wherein the low-frequency portion comprises signals having a frequency of less than about 2000 Hz.

The invention claimed is:

1. A media playback system, comprising:

a first playback device comprising a first side-firing transducer or array configured to output sound along a first sound axis;

a second playback device comprising a second side-firing transducer or array configured to output sound along a second sound axis;

one or more processors; and data storage storing instructions that, when executed by the one or more processors, cause the media playback system to perform operations comprising:

receiving multichannel audio content comprising (i) first vertical content having a first high-frequency portion and a first low-frequency portion, and (ii) second vertical content having a second high-frequency portion and a second low-frequency portion; and synchronously playing back the first low-frequency portion of the first vertical content via the first side-firing transducer or array and playing back the second low-frequency portion of the second vertical content via the second side-firing transducer or array.

2. The media playback system of claim 1, wherein the first playback device further comprises a first up-firing transducer or array, and wherein the operations comprise determining a first delay, and wherein playing back the first low-frequency portion of the first vertical content via at least the first side-firing transducer or array comprises delaying playback of the first low-frequency portion of the first vertical content via the first side-firing transducer or array by an amount of time corresponding to the first delay with respect to playback of the first low-frequency portion of the first vertical content via the first up-firing transducer or array.

3. The media playback system of claim 2, wherein the first playback device is disposed in a listening environment, and wherein determining the first delay comprises receiving, via a sensor, first data indicating a target listening location within the listening environment.

4. The media playback system of claim 3, wherein the operations further comprise:

receiving, via the sensor, second data indicating a second target listening location within the listening environment, wherein the second target listening location is different from the first; and based on the second data, determining a second delay different from the first delay; and delaying playback of the first low-frequency portion of the first vertical content via the first side-firing transducer or array by an amount of time corresponding to the second delay with respect to playback of the first low-frequency portion of the first vertical content via the first up-firing transducer or array.

5. The media playback system of claim 3, wherein the sensor is carried by the first playback device.

6. The media playback system of claim 3, further comprising a network interface, wherein the sensor is carried by a network device, and wherein the determining the first delay comprises receiving the first data from the sensor via the network interface.

7. The media playback system of claim 1, wherein the first playback device further comprises a first up-firing transducer or array, and wherein the operations comprise playing back the first high-frequency portion of the first vertical content via only the first up-firing transducer or array.

8. A first playback device, comprising:

a first side-firing transducer or array configured to output sound along a first sound axis;

one or more processors; and data storage storing instructions that, when executed by the one or more processors, cause the first playback device to perform operations comprising:

receiving multichannel audio content comprising first vertical content having a first high-frequency portion and a first low-frequency portion; and playing back, via the first playback device, the first low-frequency portion of the first vertical content via the first side-firing transducer or array, while a second playback device synchronously plays back a second high-frequency portion of second vertical content via a second side-firing transducer or array of the second playback device.

9. The first playback device of claim 8, wherein the first playback device further comprises a first up-firing transducer or array, and wherein the operations comprise determining a first delay, and wherein playing back the first low-frequency portion of the first vertical content via at least the first side-firing transducer or array comprises delaying playback of the first low-frequency portion of the first vertical content via the first side-firing transducer or array by an amount of time corresponding to the first delay with respect to playback of the first low-frequency portion of the first vertical content via the first up-firing transducer or array.

10. The first playback device of claim 9, wherein the first playback device is disposed in a listening environment, and wherein determining the first delay comprises receiving, via a sensor, first data indicating a target listening location within the listening environment.

11. The first playback device of claim 10, wherein the operations further comprise:

receiving, via the sensor, second data indicating a second target listening location within the listening environment, wherein the second target listening location is different from the first; and based on the second data, determining a second delay different from the first delay; and delaying playback of the first low-frequency portion of the first vertical content via the first side-firing transducer or array by an amount of time corresponding to the second delay with respect to playback of the first low-frequency portion of the first vertical content via the first up-firing transducer or array.

12. The first playback device of claim 10, wherein the sensor is carried by the first playback device.

13. The first playback device of claim 10, further comprising a network interface, wherein the sensor is carried by a network device, and wherein the determining the first delay comprises receiving the first data from the sensor via the network interface.

14. The first playback device of claim 8, wherein the first playback device further comprises a first up-firing transducer or array, and wherein the operations comprise playing back the first high-frequency portion of the first vertical content via only the first up-firing transducer or array.

15. One or more tangible, non-transitory computer-readable media storing instructions that, when executed by one or more processors of a first playback device, cause the first playback device to perform operations comprising:

receiving multichannel audio content comprising first vertical content having a first high-frequency portion and a first low-frequency portion; and playing back, via the first playback device, the first low-frequency portion of the first vertical content via a first side-firing transducer or array of the first playback device, while a second playback device synchronously plays back a second high-frequency portion of second vertical content via a second side-firing transducer or array of the second playback device.

16. The one or more computer-readable media of claim 15, wherein the first playback device further comprises a first up-firing transducer or array, and wherein the operations comprise determining a first delay, and wherein playing back the first low-frequency portion of the first vertical content via at least the first side-firing transducer or array comprises delaying playback of the first low-frequency portion of the first vertical content via the first side-firing transducer or array by an amount of time corresponding to the first delay with respect to playback of the first low-frequency portion of the first vertical content via the first up-firing transducer or array.

17. The one or more computer-readable media of claim 16, wherein the first playback device is disposed in a listening environment, and wherein determining the first delay comprises receiving, via a sensor, first data indicating a target listening location within the listening environment.

18. The one or more computer-readable media of claim 17, wherein the operations further comprise:

receiving, via the sensor, second data indicating a second target listening location within the listening environment, wherein the second target listening location is different from the first; and based on the second data, determining a second delay different from the first delay; and delaying playback of the first low-frequency portion of the first vertical content via the first side-firing transducer or array by an amount of time corresponding to the second delay with respect to playback of the first low-frequency portion of the first vertical content via the first up-firing transducer or array.

19. The one or more computer-readable media of claim 17, wherein the sensor is carried by the first playback device.

20. The one or more computer-readable media of claim 17, wherein the determining the first delay comprises receiving the first data from the sensor via a network interface of the first playback device.

* * * * *